United States Patent [19]

Morgan

[11] Patent Number: 5,287,685
[45] Date of Patent: Feb. 22, 1994

[54] SEED HARVESTER

[75] Inventor: John P. Morgan, Argyle, Canada

[73] Assignee: Hoechst Canada Inc., Saskatchewan, Canada

[21] Appl. No.: 907,572

[22] Filed: Jul. 2, 1992

[51] Int. Cl.$^5$ .................. A01D 45/22; A01D 46/20; A01D 67/00

[52] U.S. Cl. ........................ 56/126; 56/16.7; 56/16.6

[58] Field of Search .............. 56/126, 128, 130, 16.6, 56/16.7

[56] References Cited

U.S. PATENT DOCUMENTS

| | | |
|---|---|---|
| 765,831 | 7/1904 | Hall . |
| 1,587,349 | 6/1921 | Otis et al. . |
| 2,022,779 | 12/1935 | Peppard, Jr. ............. 56/126 |
| 2,245,081 | 6/1941 | Pierce ..................... 56/126 |
| 2,412,002 | 12/1946 | Nelson et al. . |
| 2,658,321 | 11/1953 | Armstrong . |
| 3,073,098 | 1/1963 | Farrar et al. . |
| 4,587,799 | 5/1986 | Thomas ................... 56/126 X |

*Primary Examiner*—Stephen J. Novosad
*Attorney, Agent, or Firm*—Hugh O'Gorman; Stewart L. Gitler; Martin P. Hoffman

[57] ABSTRACT

An apparatus is disclosed for harvesting seed which includes a frame and a housing defining a seed box and having a rotary brush mounted on a forward portion thereof which is connected to link bars which are in turn connected to the frame. Corresponding pairs of link bars are attached between the frame and housing on opposite sides of the apparatus, the link bars on each side being substantially parallel to each other. Means are provided for varying the angle of the link bars to the frame, the link bars operationally functioning as a parallelogram to raise or lower the housing at a constant angle relative to the frame. A draw bar is pivotably connected to the front of the frame and tilt angle adjustment means are provided to vary the angle between the frame and the draw bar thereby providing an independent means for varying the angle of attack of the rotary brush to the plants from which seed is being collected.

19 Claims, 4 Drawing Sheets

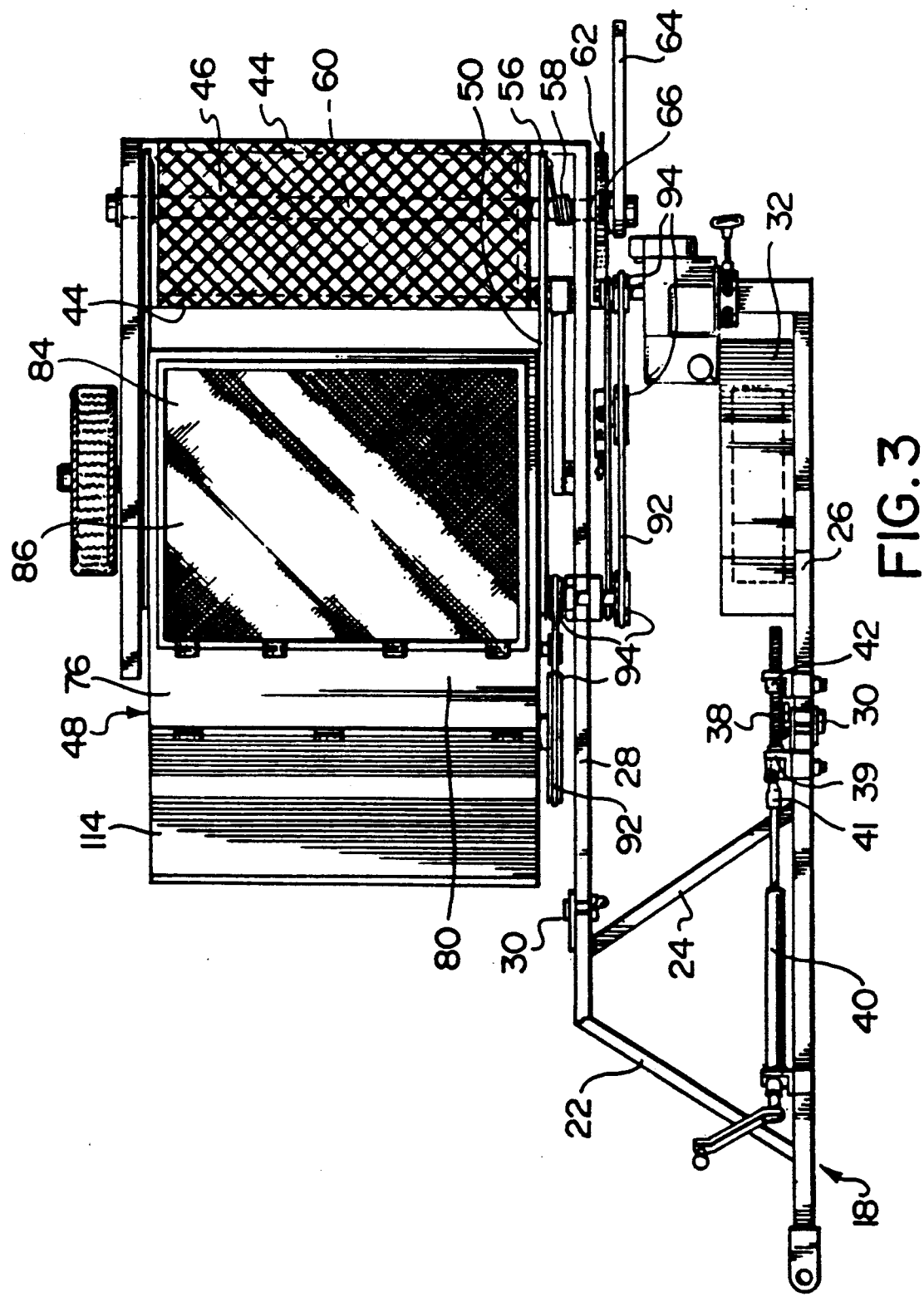

SEED HARVESTER

TECHNICAL FIELD

This invention relates to devices for harvesting seeds from grasses and other plants.

BACKGROUND OF THE INVENTION

The present invention has a particular application to harvesting seed from native grasses and wild flowers in their native habitat. Many species of grasses and wild flowers native to the prairies are in danger of being lost due to exclusion from their native habitats due to the incursions of man. It is now being recognized that re-seeding of areas previously taken for agricultural or other purposes, is desirable. In order to reseed such areas with native grasses and wild flowers, it is necessary to recover seeds from such species where they occur naturally. This may often be in rough terrain that is not amenable to normal harvesting methods. Further, many wild plant varieties are endangered species, and harvesting of seed should be undertaken in such a manner as to impact the plants and their habitat as little as possible.

A number of prior art devices exist which deal with various aspects of gathering seed from crops and other plants in the field.

Hall (U.S. Pat. Ser. No. 765,831) discloses a seed stripping apparatus comprising a farm implement having a rotary brush and a hopper. The rotary brush knocks the seed off the plants into a gathering area. In order to prevent the seed being lost, a rotary fan is mounted above and behind the rotary brush to cause a counter-current of air to force the floating seed down behind the rotary brush and into a seed box. Hall also discloses a single towing bar offset to one side of the rotary brush. A handle is provided to adjust the height of the rotary brush above the ground.

Otis (U.S. Pat. No. 1,587,349) discloses a rotary brush mechanism supported on the end of an arm. The arm's height may be pre-adjusted in fixed increments. A hopper consisting of a two member clamshell-like cowling encapsulates the rotary brush, and provides a downwardly presented throat into which seed bearing portions of plants being harvested protrude. The plants are acted upon by the brush and the air current it creates in order to remove the seed from the plant. The hopper members are spaced apart at the top to provide a vent for the air current. The angle of presentation of the throat is adjustable by movement of the hopper members relative to each other, in order to compensate for change in tilt angle with change in elevation of the arm.

Neilson (U.S. Pat. No. 2,412,002) discloses a rotary, or brush, mechanism located within a collecting box. The apparatus is mounted upon a two-wheeled trailer for towing behind a vehicle. The forward end of the box enclosing the rotary brush may be moved vertically to adjust the height of the brush. A hand operated lever is provided to raise and lower the mechanism. However, vertical adjustment also effects the "tilt" of the brush and hopper apparatus.

Armstrong (U.S. Pat. No. 2,658,321) discloses a towed seed harvester with adjustable height and angle mechanisms. A tow bar is attached to one side of the apparatus which is carried on an axle and wheels. A rotary brush knocks seeds into the rear hopper compartment which has a hinged lid on the top rear surface. The hinged lid is spaced apart from the rear wall to provide an air vent. The unit may be adjusted for vertical height and tilt angle by means of a tilt mechanism including a hand lever, movement of which adjusts the angle between the tow bar and the apparatus. Vertical height of the unit may also be adjusted by raising or lowering the apparatus relative to the axle. However, adjustment of vertical height is relatively difficult, requiring that the apparatus be independently raised or lowered on standards attached to the axle and held with bore holes in the standard aligned with bore holes in a member secured to the apparatus. Also adjustment of the height by raising or lowering the apparatus on its axle varies the ground clearance of the apparatus. Further, the tilt mechanism is relatively complex, including several elongated moving parts which may cause maintenance problems.

U.S. Pat. No. 3,073,098 to Farrar discloses an apparatus for harvesting caster beans which includes an air suctioning mechanism for harvesting beans and depositing them in a gathering mechanism.

SUMMARY OF THE INVENTION

There is a need for a grass seed stripper which is capable of operating over an extended range of heights above the ground, and at adjustable angles of tilt, and which is capable of being used in rough terrain to harvest seed. Further, such an apparatus should be relatively light-weight and adapted to avoid unnecessary impact on the area being harvested.

Accordingly, the present invention provides a seed harvester comprising: a frame supported on wheels rotatably attached thereto; a housing defining a rear seed box and a forward brush support portion; a rotary brush on the support portion; drive means for rotating the rotary brush; elevating means adapted to vary the height of the housing above the frame at a constant angle thereto; a draw bar pivotally connected to the frame; and tilt angle adjustment means adapted to vary the angle between the frame and the draw bar.

BRIEF DESCRIPTION OF THE DRAWINGS

The present invention will now be described by way of example with reference to the accompanying drawings, in which:

FIG. 3 is a plan view of the apparatus;

BEST MODE OF THE INVENTION

Figure 1:
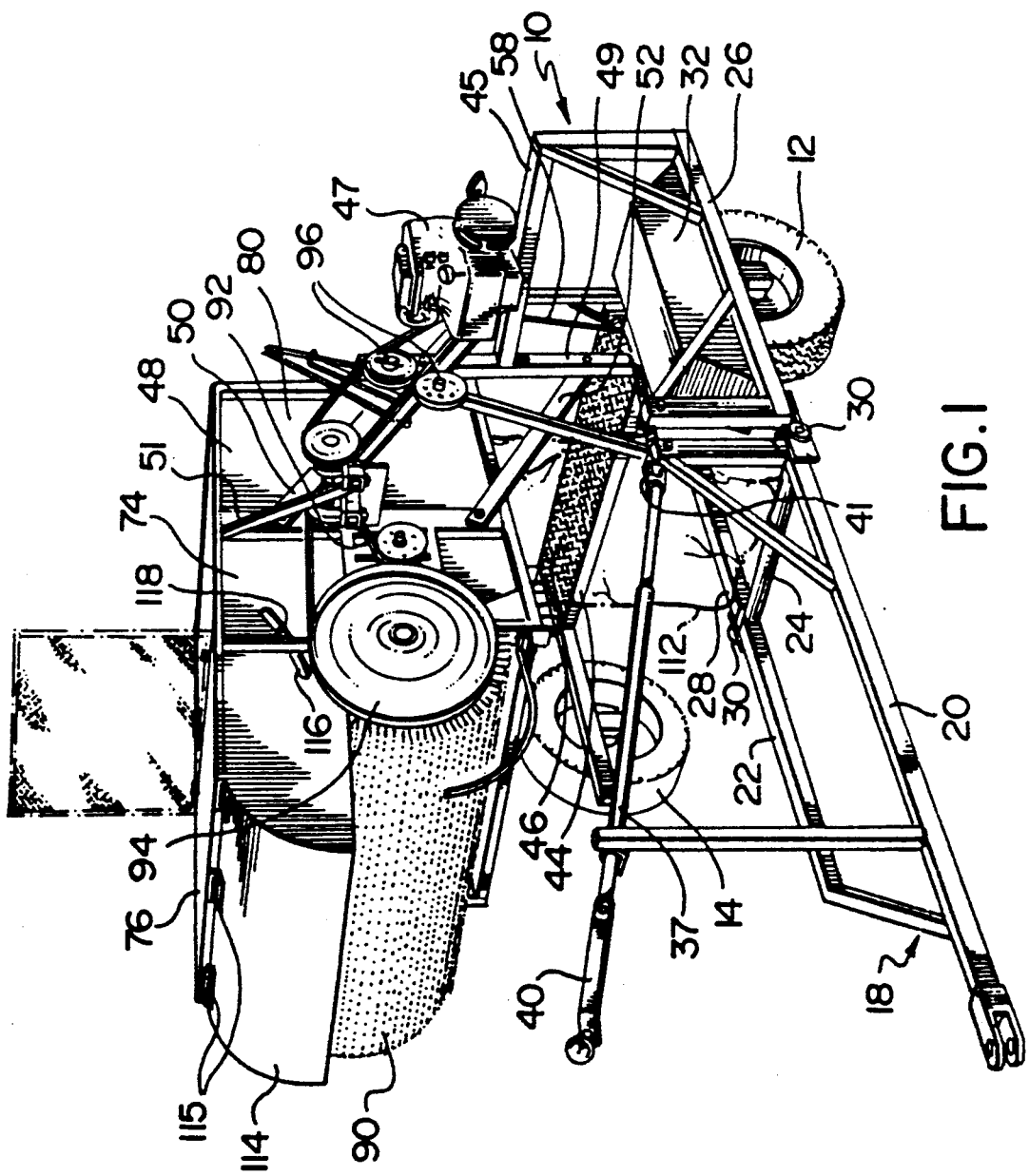
FIG. 1 is a perspective view of the apparatus.
Figure 2:
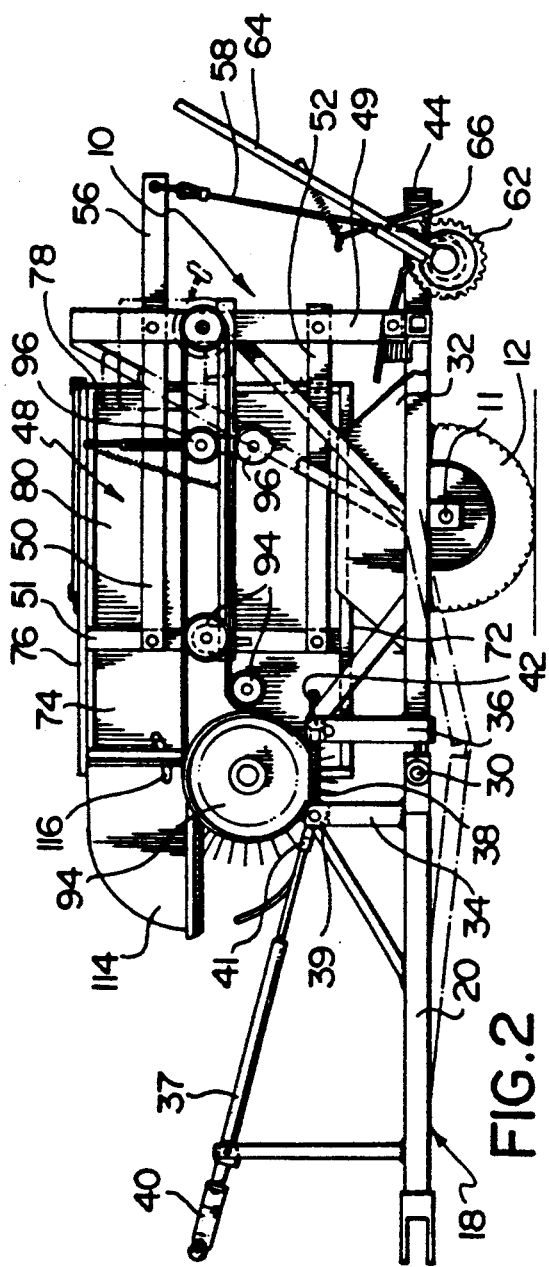
FIG. 2 is an elevation view of the apparatus.

Referring to FIG. 1, a grass and plant seed harvesting device includes a frame generally designated 10 made of sheet metal and tubular steel. The frame 10 has wheels 12, 14 attached thereto. The wheels 12, 14 may be conventional automobile wheels, and may be rotatably affixed to the frame 10 by means of conventional stub axles 11 (FIG. 2). The stub axles 11 are mounted directly to the frame 10, and remove the necessity of having a complete axle extend across the entire width of the machine. This allows for a reduction in overall weight of the machine, and increases ground clearance.

A draw bar generally designated 18 consists of tubular steel members 20, 22 (FIG. 1) and tubular steel cross member 24. The draw bar members 20, 22 are pivotally attached to tubular steel frame members 26, 28 by means of socket and pin arrangements 30. A fender 32 attached to the frame member 26 and extending over the wheel 12, provides a suitable place for mounting a spare tire or tool box.

Generally upright angle iron attachment members 34, 36 (FIG. 2) are mounted on the tubular steel member 20 and frame member 26 respectively. Elongated bolt 38 is rotatably engaged in and protrudes from a pillow block, or other known attachment member 39 which allows pivoting of the bolt relative to the attachment member 39. The attachment member 39 is mounted on the member 34 with the bolt 38 extending from the member 34 through a threaded bore hole 42 in the upstanding member 36 in which the bolt is engaged. A shaft 37 having a handle 40 at one end and clevis 41 at the other is attached to the bolt 38 for manual rotation thereof. The angle between the draw bar 18 and the frame members 26, 28 (FIG. 1) and consequently the tilt angle of the apparatus relative to the ground, may be adjusted by manually turning the handle 40. This causes the bolt 38 to turn in threads in the bore hole 42 thereby varying the distance between the generally upstanding members 34, 36, and pivoting about the socket and pin arrangement 30. This pivoting action is compensated for by the tilting of the bolt 38 in its attachment member 39.

Tubular steel rear cross frame elements 44 and a steel screen 46 form a step at the rear of the apparatus. An operator may gain access to the top of the apparatus by standing on the screen 46. Also located at the rear of the frame 10 is a motor mount 45 (FIG. 1) formed of tubular steel. A five horse power gasoline engine 47 is mounted on the engine mount 45. The motor 47 may generally be a conventional lawnmower engine, which provides sufficient power and is of relatively light weight.

Figure 5:
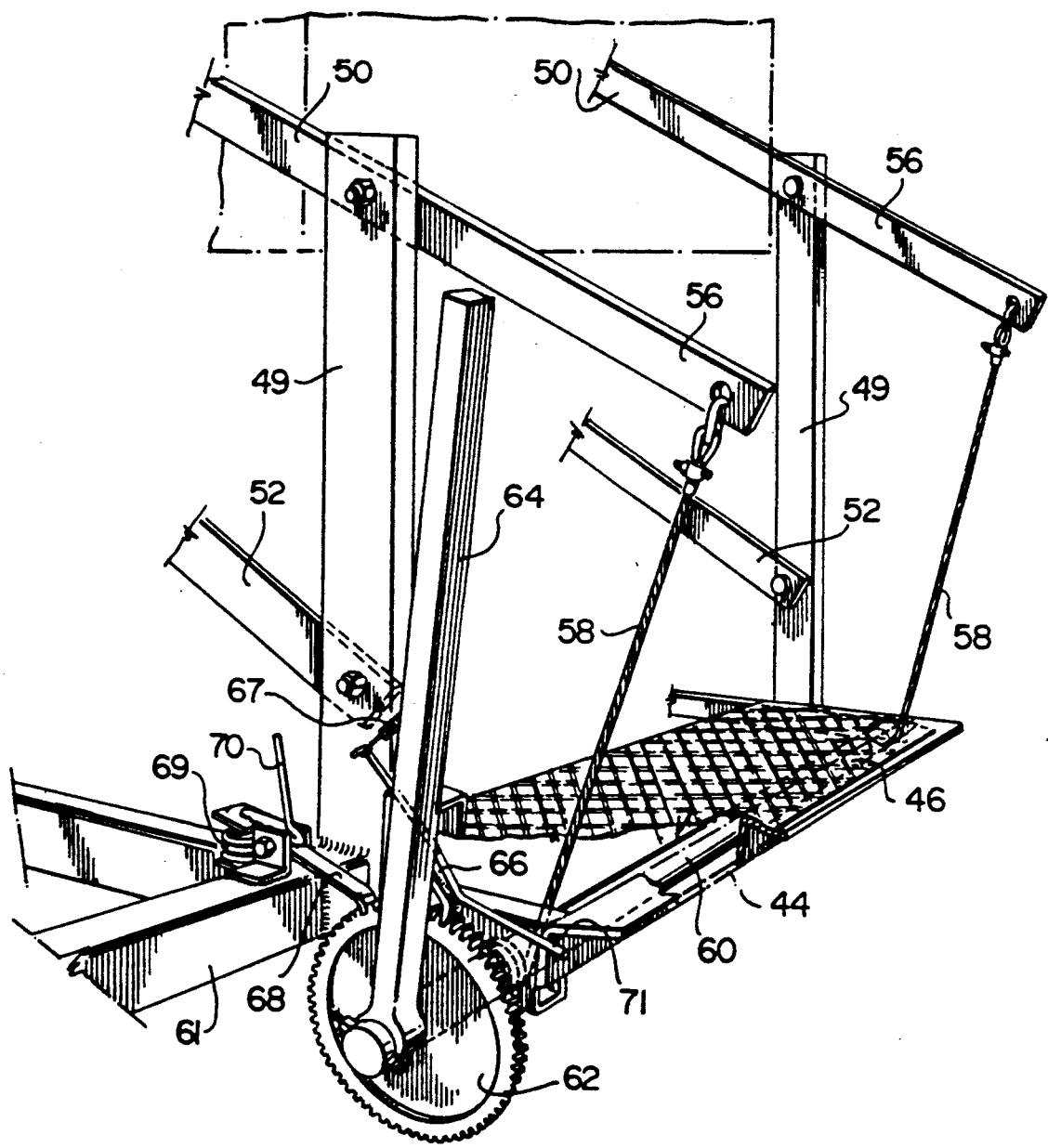
FIG. 5 is a perspective view of the operative portion of the elevating means of the apparatus.

A housing 48 is located above the frame 10. Two elevating elements, link bars 50, 52, are attached between upstanding frame member 49 and a stiffener 51 on a side wall of the housing 48. A corresponding pair of elevating elements (see FIG. 5) are similarly attached between the frame 10 and the housing 48 on the opposite side of the apparatus. The connections between the link bars 50, 52 and the upstanding frame members 49 and stiffener 51 are pivotal. The link bars 50, 52 are substantially parallel to each other, and operationally function substantially as a parallelogram. Link bar angle adjustment means (described below) are provided to vary the angle of the link bars 50, 52 relative to the frame 10, and thereby raise or lower the housing 48 at a constant angle relative to the frame.

One of the link bars 50 on each side of the apparatus has an end portion 56 which extends beyond the pivotal connection to the upstanding frame member 49. One end of a cable 58 is attached to the end portion 56 and the other end of the cable is wound around an elevating rod 60. The rod 60 is rotatably attached to the rear of the frame 10. In a preferred embodiment, a cable is attached to one elevating element on each side of the apparatus, both cables being wound around the same rod 60. A gear wheel 62 is fixedly connected to the rod 60 and the whole is adapted to act in windlass fashion.

A handle 64 is pivotally connected to the gear wheel 62. A pawl 66 is pivotally connected to the handle 64 at a position where it may be engaged with the teeth of the gear wheel, or pivoted to disengage the gear wheel. Preferably a spring 67 biases the pawl 66 to its engaging position. When the pawl 66 is engaged with the teeth of the gear wheel, clockwise movement of the handle 64 causes the gear wheel 62 and rod 60 to turn clockwise. A brake or stop 68 is pivotally mounted on a frame member 61 at a position where it may engage the teeth of the gear wheel 62. When the stop 68 is engaged in the gear wheel 62, it prevents counterclockwise movement of the gear wheel 62 and rod 60. The stop 68 may be pivoted to a position where it does not engage the teeth of the gear wheel and is preferably biased by spring 69 to its engaged position.

The housing 48 may be raised above the frame 10 by engaging the pawl 66 in the gear wheel 62 and manually moving the handle 64 clockwise. This causes the cable 58 to wind on the rod 60 and the end 56 of the link rod 50 to move downward which in turn causes the housing 48 to move upward. The housing maintains a constant orientation relative to the frame due to the positioning and length of the four parallel elevating elements 50, 52.

To fully raise the housing, the handle 64 may be ratcheted up and down, the pawl 66 riding over the cogs of the gear wheel 62 when the handle is moved counterclockwise and engaging them on a clockwise stroke. The stop 68 rides over the cogs of the gear wheel 62 when the handle is moved clockwise but otherwise engages them.

To lower the housing under the action of gravity, the stop 68 is manually released using handle 70, with the pawl 66 engaged with the gear wheel 62. The handle 64 is manually held to control the lowering of the housing 48 by counterclockwise strokes of the handle 64 which turn the rod 60 counterclockwise and unwind the cable. When the handle 64 is at its maximum height, stop 68 is replaced to lock gear wheel 62, pawl 66 is manually disengaged by operating lever 71 and the handle 64 is moved clockwise to its next engagement position. These steps of engaging and disengaging are repeated until the housing 48 is lowered to the desired height.

Referring to FIG. 2, the housing 48 has a base 72, side walls 74, top 76 and rear wall 78. The rear portion of the housing 48 defines a seed box 80, the forward extent of which is limited by a front wall (not shown) upstanding from the base 72 and extending between the side walls 74 but not up to the top 76. An entrainment opening (not shown) is defined between the top of the front wall and the top of the housing 76.

An upper ventilation opening 84 (FIG. 3) is provided in the top 76 of the housing in the seed box 80. The opening 84 is covered by a wire mesh screen 86 sized to allow air but not seed to flow through. The screen 86 is hingedly connected to the top 76 adjacent the opening 84 and may be lifted off the opening when access to the seed box is desired.

The front portion of the housing 48 defines a rotary brush support portion to which a rotary nylon bristle brush 90 (FIG. 1) is rotatably attached. In the preferred embodiment, the brush 90 is approximately 24 inches in diameter and about 4 feet in length and is of the type commercially available for use with street sweeping apparatus. The ends of the axle (not shown) the rotary brush 90 are mounted in pillow blocks (not shown) having bearings, which allow the brush 90 to turn freely. The bearings have grease fittings (not shown) for proper lubrication.

The brush is driven by means of a system of endless flexible drive elements 92 and cooperating drive transmission members 94 which mechanically connect the motor 47 to the brush 90. In the embodiment shown, the drive is in the form of a conventional Belt and pulley system. Two drive element tensioning members 96 are located on the side wall 74 of the housing 48, and positioned such that they apply variable pressure on the drive belts 92 at varying elevations of the housing 48 relative to the frame 10. The tensioning members 96 provide a relatively constant tension on the drive belts irrespective of the height of the housing 48.

The brush 90 may be driven by the motor 47 in either direction. However, in collecting seed from most plant varieties, it is preferable that the brush rotate upwardly and inwardly (clockwise in FIG. 1). The speed of rotation of the brush 90 is controlled by the throttle speed setting on the motor 47.

Figure 4:
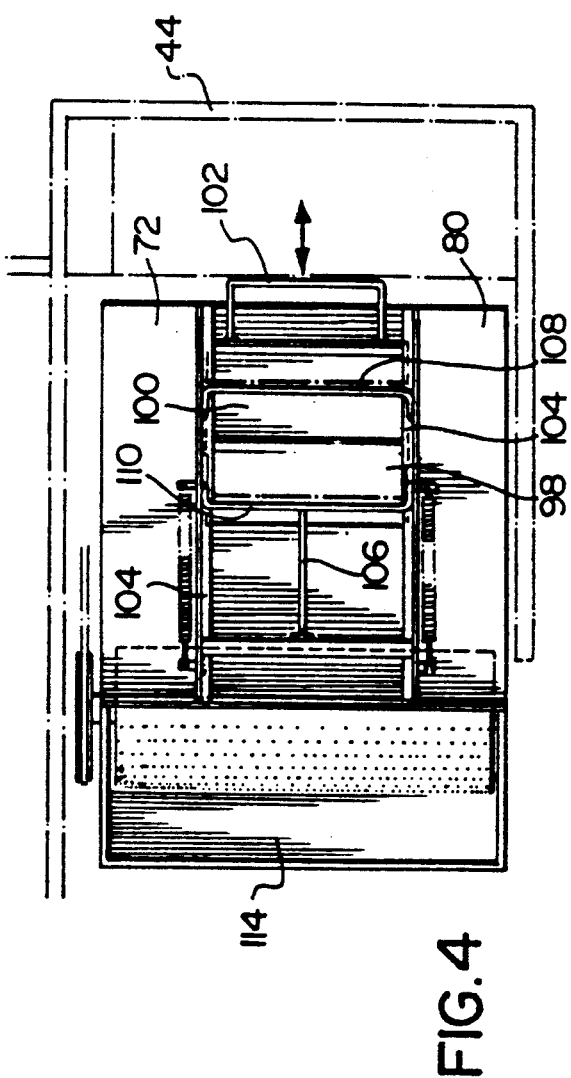
FIG. 4 is a bottom view of the housing of the apparatus.

Referring to FIG. 4, there is an opening 98 shown in outline in the base 72 of the housing 48. A trap door 100, with a handle 102 attached thereto engages angle iron guides 104 which are mounted adjacent opposite sides of the opening 98. A rod 106 extends through apertures in angle iron elements on the trap door 100 to assist in guiding the door 100. A seed bag holder comprising a fixed holder element 108 and a rotatable spring biased seed bag holder element 110 are adapted to receive and releasably retain a seed bag under the opening 98. Specifically, when the seed box is full of collected seed and it is desired to empty the seed, a seed bag is retained under the opening by the seed bag holder. The trap door 100 is then manually opened by means of the handle 102 and seed pours from the seed box 80 into the seed bag 112.

Referring to FIG. 1, a cowling 114 is rotatably mounted on the top front portion of the housing 48 by means of hinges 115 attached between the top of cowling 114 and the top 76 of the housing 48. A slot 116 in the side of the cowling 114 is engagable by locking nut and bolt 118 which pass through an aperture in a side wall 74 of the housing 48 and permits the cowling 114 to be pivoted on the hinges 115 and locked in different positions. The angle of the cowling 114 may be adjusted for optimum setting which will vary depending upon the species of plant being harvested and the weight of its seed. Accordingly, some experimentation is required to obtain the optimum setting for each species being harvested.

In the preferred embodiment, the apparatus is approximately 8 feet in length between the draw bar 18 and the rear of the housing, and approximately 5 feet in width between the outside of the wheels.

In operation, the seed stripper is attached by means of the draw bar 18 to a vehicle for towing. The tilt angle and height of the housing and the angle of the cowling are set for the particular seed collection application. The motor 47 is then started to rotate the rotary brush 90. As the harvesting apparatus is drawn over the plants from which seed is being collected, the rotary brush 90 knocks seed off the plants. A draft is created by the rotary brush 90 causing air to flow through the housing 48 and out through the wire mesh screen 86. The seeds which have been knocked from their plants are usually quite light, and are entrained by the flow of air through the opening between the front wall defining the forward extend of the seed box 80 and housing top 76, into the seed box where escape is prevented by the wire mesh 86.

During operation, the height of the housing 48 above the frame 10, and therefore above the ground, may be adjusted by operating the windlass 60, 62, 64, 66, 68 in order to achieve optimum harvesting position and/or to avoid obstacles. The elevation of the housing may be varied anywhere from approximately 10 inches to 5 feet above the ground. By providing for a wide range of heights, the invention is capable of use with respect to a wide variety of plant species and may be used to reach areas which would not be accessible with a convention seed gatherer with more limited height variability.

The tilt angle of the apparatus will be set by the operator according to the type of seed being harvested. The tilt angle is independently adjustable by means of bolt 38 and handle 40. Generally, the angle may be adjusted between an angle of approximately 15° below the horizontal (as shown in chain line in FIG. 2) to an angle of approximately 15° above the horizontal. By independently altering the angle, the efficiency of the machine is enhanced.

The seed box of the apparatus will hold approximately 2 bags of seed and may be filled in 1 to 4 hours, depending upon how thick the stand of vegetation being harvested is.

The preferred embodiment of the invention is light in weight, weighing approximately 500 pounds. Due to this fact, it is capable of being pulled by small vehicles such as all-terrain vehicles or garden tractors, and has a low impact on the prairies being harvested. It has been found to be versatile and durable despite its light weight.

The invention has been described with the collection of seed from wild grasses and other plants as the primary application, however, it will be recognized by those skilled in the art that the invention may also be used for collecting seed from cultivated crops. Further, while the invention has been described in conjunction with a preferred embodiment thereof, it will be obvious to those skilled in the art that numerous modifications, in addition to those discussed above, may be made to the preferred embodiment without departing from the spirit and scope of the invention as defined in the appended claims.

What is claimed is:

1. A seed harvester comprising:
   (a) a frame supported on wheels rotatably attached thereto;
   (b) a housing defining a rear seed box and a forward brush support portion;
   (c) a rotary brush on the support portion;
   (d) drive means for rotating the rotary brush;
   (e) elevating means adapted to vary the height of the housing above the frame at a constant angle thereto;
   (f) a draw bar pivotally connected to the frame;
   (g) tilt angle adjustment means adapted to vary the angle between the frame and the draw bar;
   (h) a cowling pivotally attached to said brush support portion and positioned to extend over the rotary brush; and
   (i) cowl adjustment means adapted to vary the angle of the cowling relative to the brush support portion.

2. A seed harvester according to claim 1 wherein the elevating means comprise:
   (a) a pair of link bars on each side of the harvester, each link bar being pivotally connected to the housing near a first end of the bar, and pivotally connected to the frame near a second end of the bar, each link bar of each pair being substantially parallel; and
   (b) link bar angle adjustment means adapted to selectively vary the angle of the link bar to the frame.

3. A seed harvester according to claim 2, wherein the link bar angle adjustment means comprise:
  (a) cable means having a first end attached to one of the link bars between the second end of said bar and the pivotal connection of the bar to the frame; and
  (b) cable connector means attached to the frame adapted to engage the cable and including means for selectively varying the length of cable between it and the link bars.

4. A seed harvester according to claim 3, wherein said cable connector means comprise:
  (a) a cable receiving rod rotatably attached to the frame;
  (b) rotation means for rotating the rod to take up or pay out the cable means from said rod; and
  (c) releasable brake means for selectively locking the rod against rotation.

5. A seed harvester according to claim 4, wherein said rotation means comprise a gear wheel affixed to said rod and a manually operable handle pivotally connected to the gear wheel having a pawl attached thereto, selectively engageable with teeth of the gear wheel.

6. A seed harvester according to claim 5, wherein said brake means comprises a stop pivotally mounted on said frame for selective engagement with teeth of the gear wheel.

7. A seed harvester according to claim 6, including a seed bag holder mounted on the underside of the base to releasably hold a seed bag under the discharge opening.

8. A seed harvester according to claim 2, wherein the seed box is defined by a base, sides, rear and top of said housing and front wall attached to the base and sides of the housing behind the rotary brush, an entrainment opening being defined between the top of the housing and the top of the front wall; a ventilation opening for the seed box having a cover adapted to allow air but not seed to pass through, a discharge opening in the base of the seed box, and a closure member for the discharge opening.

9. A seed harvester according to claim 2, wherein the drive means comprises:
  (a) a motor mounted on the frame;
  (b) a system of endless flexible drive elements and cooperating drive transmission members mechanically connecting drive transmission members on the motor and the brush; and
  (c) one or more drive element tensioning members mounted on the housing and positioned so as to maintain a relatively constant tension on the endless drive elements when the housing is moved relative to the frame.

10. A seed harvester according to claim 2, wherein the tilt angle adjustment means comprises:
  (a) an attachment member mounted on the draw bar having a bolt pivotally mounted for rotation thereon;
  (b) an attachment member mounted on the towing element having a threaded bore hole in which the bolt is engaged; and
  (c) means for turning the bolt to vary the distance between the respective attachment members.

11. A seed harvester comprising:
  (a) a frame supported on wheels rotatably attached thereto;
  (b) a housing defining a rear seed box and a forward brush support portion;
  (c) a rotary brush on the support portion;
  (d) drive means for rotating the rotary brush;
  (e) elevating means adapted to vary the height of the housing above the frame at a constant angle thereto including:
    (I) a pair of link bars on each side of the harvester, each link bar being pivotally connected to the housing near a first end of the bar, and pivotally connected to the frame near a second end of the bar, each link bar of each pair being substantially parallel; and
    (II) link bar angle adjustment means adapted to selectively vary the angle of the link bar to the frame;
  (f) a draw bar pivotally connected to the frame; and
  (g) tilt angle adjustment means adapted to vary the angle between the frame and the draw bar.

12. A seed harvester according to claim 11, wherein the link bar angle adjustment means comprise:
  (a) cable means having a first end attached to one of the link bars between the second end of said bar and the pivotal connection of the bar to the frame; and
  (b) cable connector means attached to the frame adapted to engage the cable and including means for selectively varying the length of cable between it and the link bars.

13. A seed harvester according to claim 12 wherein said cable connector means comprise:
  (a) a cable receiving rod rotatably attached to the frame;
  (b) rotation means for rotating the rod to take up or pay out the cable means from said rod; and
  (c) releasable brake means for selectively locking the rod against rotation.

14. A seed harvester according to claim 13 wherein said rotation means comprise a gear wheel affixed to said rod and a manually operable handle pivotally connected to the gear wheel having a pawl attached thereto, selectively engageable with teeth of the gear wheel.

15. A seed harvester according to claim 14 wherein said brake means comprises a stop pivotally mounted on said frame for selective engagement with teeth of the gear wheel.

16. A seed harvester according to claim 15 including a seed bag holder mounted on the underside of the base to releasably hold a seed bag under the discharge opening.

17. A seed harvester according to claim 11 wherein the seed box is defined by a base, sides, rear and top of said housing and a front wall attached to the base and sides of the housing behind the rotary brush, an entrainment opening being defined between the top of the housing and the top of the front wall; a ventilation opening for the seed box having a cover adapted to allow air but not seed to pass through, a discharge opening in the base of the seed box, and a closure member of the discharge opening.

18. A seed harvester according to claim 11 wherein the drive means comprises:
  (a) a motor mounted on the frame;
  (b) a system of endless flexible drive elements and cooperating drive transmission members mechanically connecting drive transmission members on the motor and the brush; and
  (c) one or more drive element tensioning members mounted on the housing and positioned so as to maintain a relatively constant tension on the endless drive elements when the housing is moved relative to the frame.

19. A seed harvester according to claim 11 wherein the tilt angle adjustment means comprises:

(a) an attachment member mounted on the draw bar having a bolt pivotally mounted for rotation thereon;

(b) an attachment member mounted on the towing element having a threaded bore hole in which the bolt is engaged; and (c) means for turning the bolt to vary the distance between the respective attachment members.

* * * * *